Aug. 18, 1970   J. L. MEDEIROS   3,524,674
SEMI-RIGID SUPPORT FOR UPPER STRUCTURE
Filed Oct. 18, 1967   4 Sheets-Sheet 4
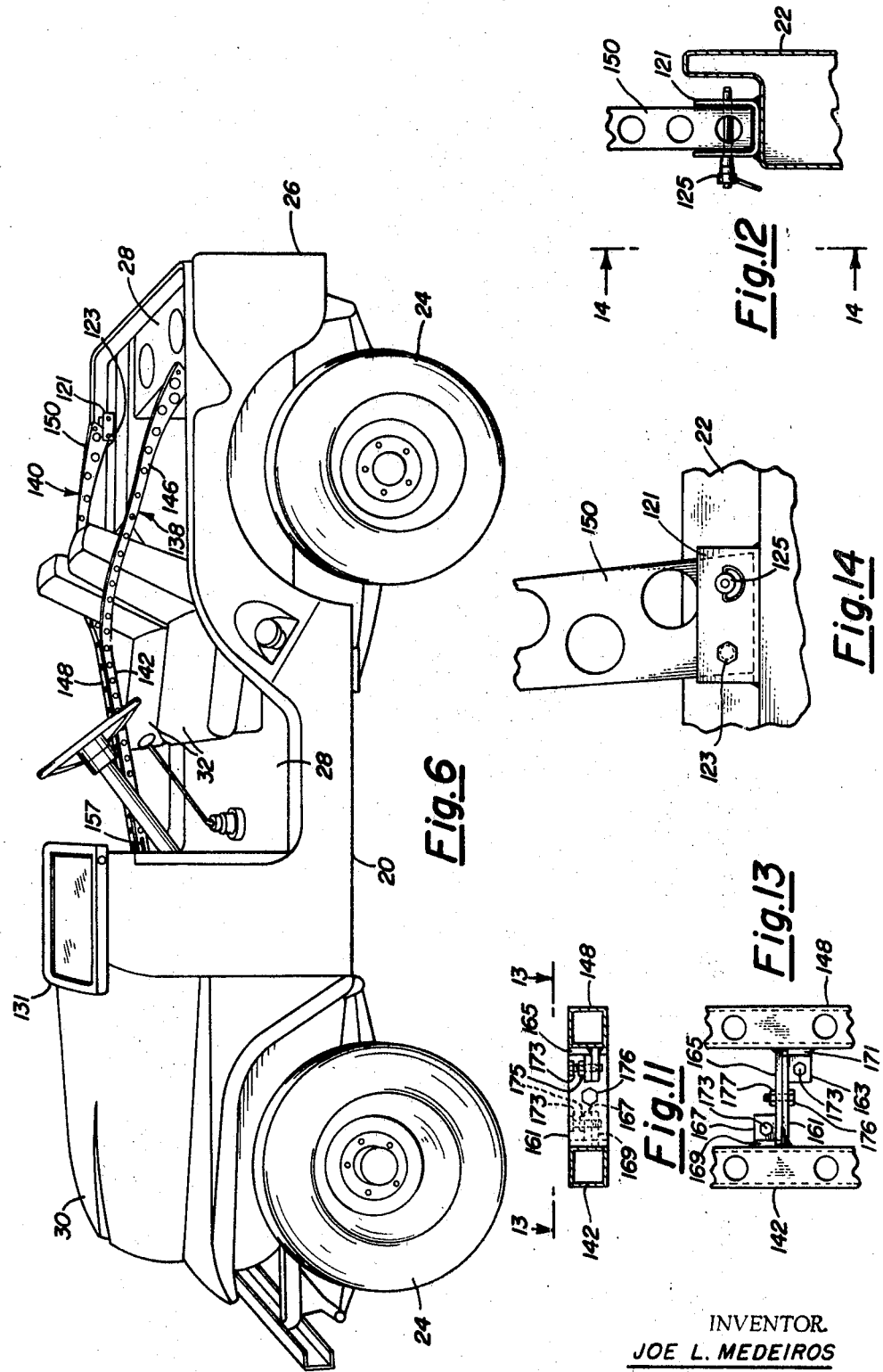
INVENTOR.
JOE L. MEDEIROS
BY
ATTORNEYS United States Patent Office 3,524,674
Patented Aug. 18, 1970

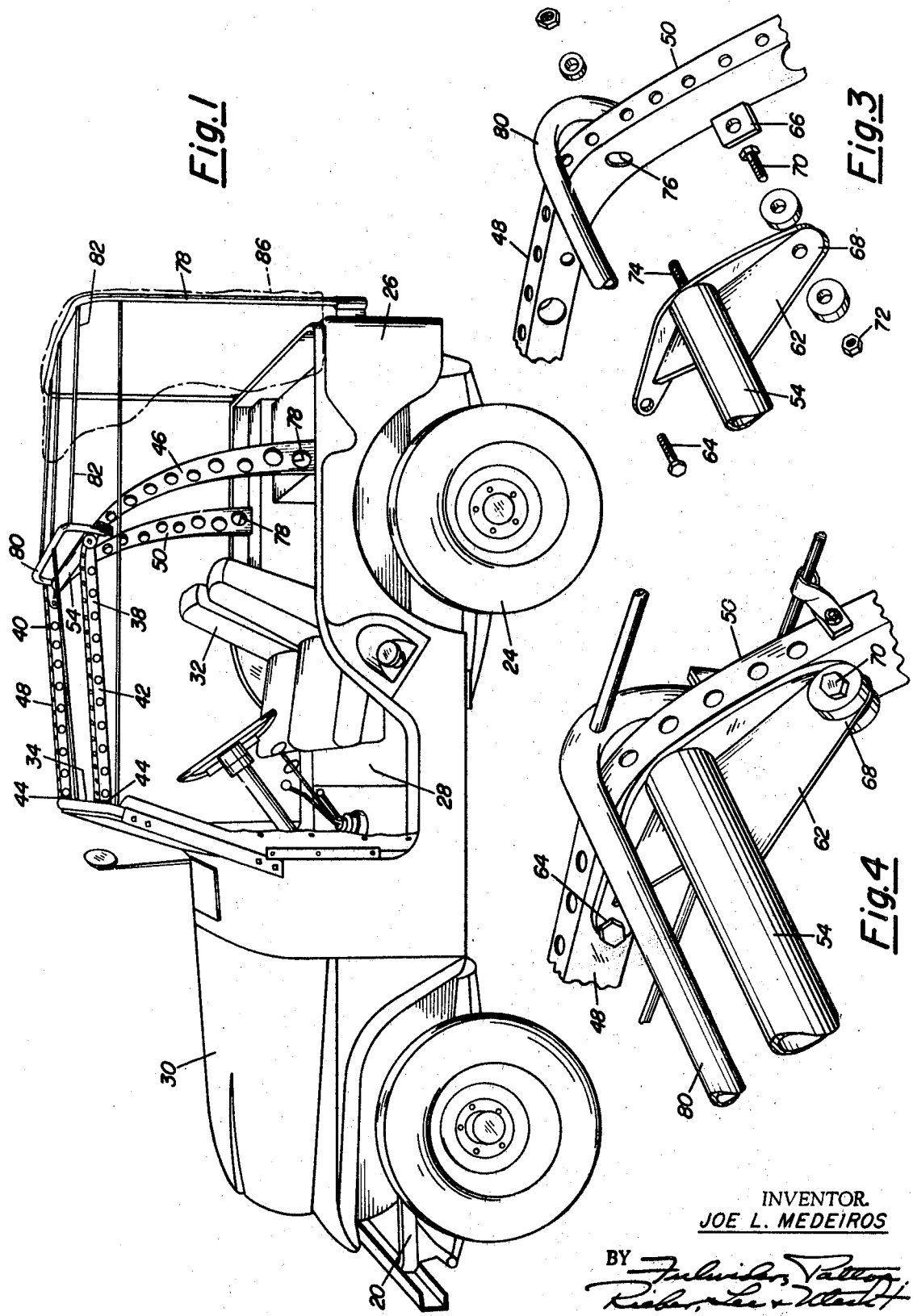

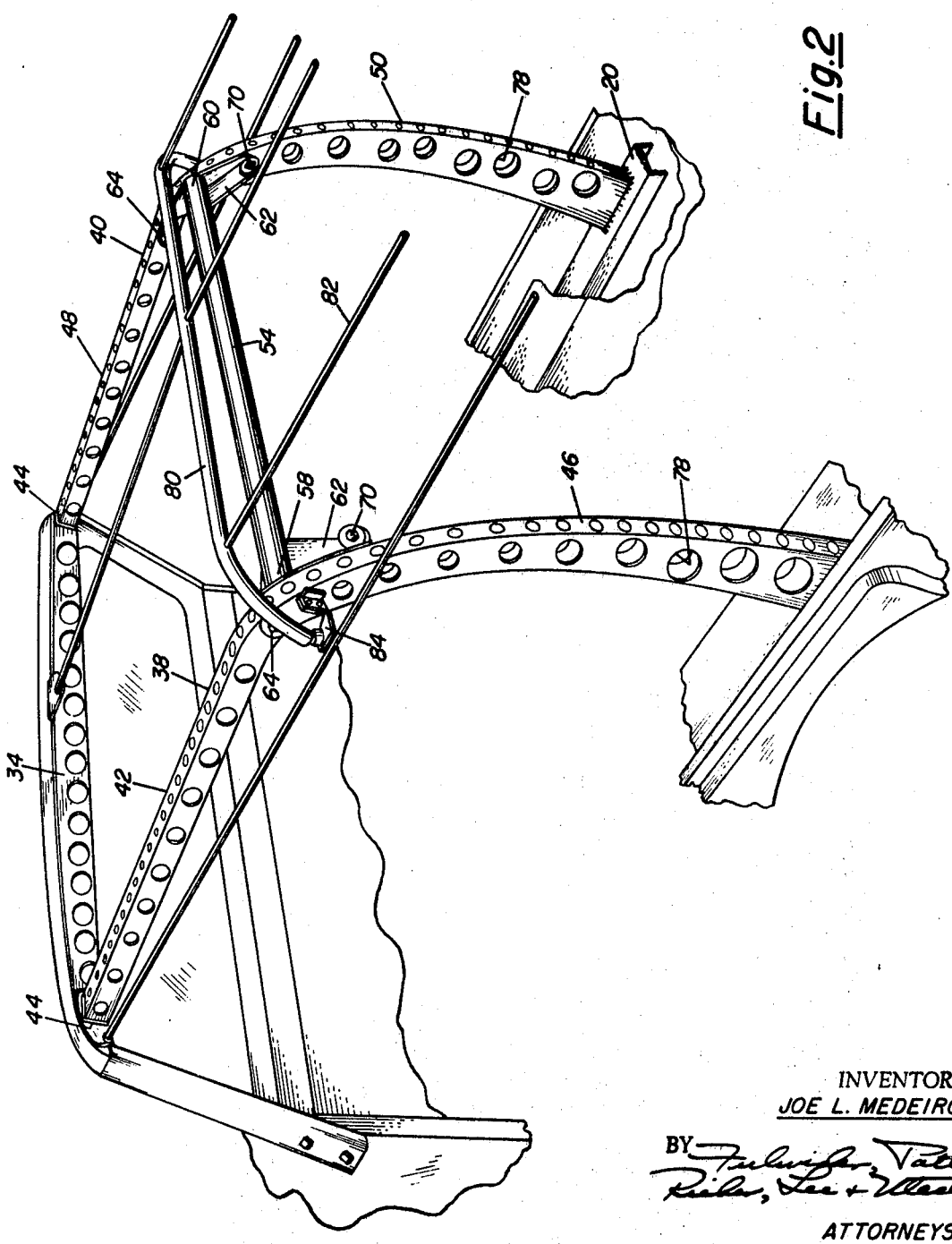

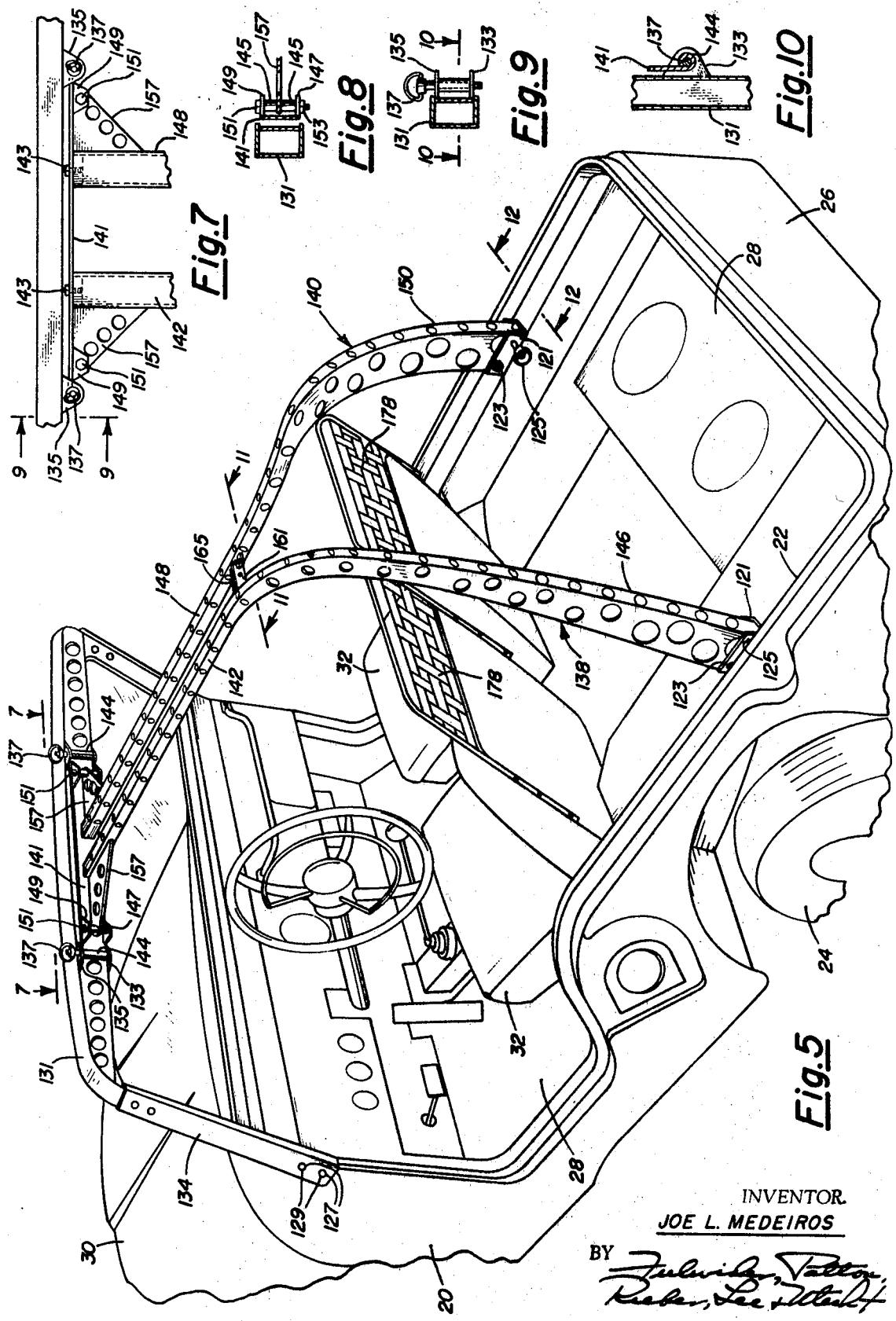

3,524,674
SEMI-RIGID SUPPORT FOR UPPER STRUCTURE
Joe L. Medeiros, 6694 San Miguel,
Lemon Grove, Calif. 92045
Continuation-in-part of application Ser. No. 556,680,
June 10, 1966. This application Oct. 18, 1967, Ser.
No. 687,408
Int. Cl. B62d 25/06
U.S. Cl. 296—102                                 15 Claims

ABSTRACT OF THE DISCLOSURE

A vehicle in which the chassis frame carries a passenger seat and a frame for protecting the passengers, which frame includes side frame sections; these side frames are connected with one another by resilient means (rubber) for providing relative vertical movement therebetween.

---

The present application is a continuation-in-part of my copending application, Ser. No. 556,680, filed June 10, 1966, and now abandoned.

The present invention relates to vehicles and more particularly to vehicles which, when moved, are subjected to uneven surfaces, such as boats which are subjected to waves and swells, or road vehicles which are subjected to uneven terrain. Such vehicles are also subjected to impact which causes whiplash injuries to the neck of the passenger in the vehicle.

More particularly, the invention is directed to so-called "convertibles" having a frame above the passenger compartment for supporting a flexible top, such as that formed of canvas. Heretofore, these frames for supporting the canvas were relatively frail and should the road vehicle overturn, the cover carrying frame would collapse, quite often causing injury and/or death to the occupant of the vehicle.

It has been found in actual practice that if the cover supporting frame is of sufficient strength and rigidity, to withstand collapsing, the rigidity of this cover supporting frame was of such value that when the vehicle was subjected to lateral unevenness of the terrain over which it is moving, quite often the chassis of the vehicle would be cracked.

In carrying out the present invention, at least two side frame sections are connected with one another to provide sufficiently rigidity to prevent collapsing in the event that the vehicle is overturned, and means is provided for allowing a limited movement between the frame sections which limited movement is of sufficient value to prevent cracking of the chassis frame when the vehicle is subjected to uneven lateral terrain.

In one embodiment of the invention shown in FIGS. 1 to 4, the windshield frame is resiliently connected with the side frame sections which supports the rearwardly extending cover. In this embodiment, the rear lower ends of the side frame sections are connected with the chassis. A bar resiliently connects the side frame sections, the resiliency being limited whereby, in the event that the vehicle overturns, sufficient rigidity is maitained between the two side frame sections to prevent the collapsing thereof.

In another embodiment, as shown in FIGS. 5–14, the lower, rear ends of the side frame sections are pivotally attached to the chassis frame, and the front ends of the frame sections are removable as well as resiliently connected with the windshield frame.

Other features and advantages of this invention will be apparent from the following description, reference being had to the accompanying drawings wherein preferred embodiments of the invention are illustrated.

In the drawings:
FIG. 1 is a perspective view of a vehicle embodying one embodiment of my invention; part of the cover for the vehicle is shown in dot and dash lines;
FIG. 2 is a fragmentary view in perspective of supporting structures for the passenger's protective frame and a perspective view of that frame;
FIG. 3 is a fragmentary and exploded perspective view of two of the side frame sections of the passenger's protective frame;
FIG. 4 is a fragmentary, perspective view of the frame sections shown in FIG. 3 but showing same in assembled relationship;
FIG. 5 is a fragmentary sectional view of a vehicle embodying another aspect of the invention;
FIG. 6 is a perspective view of the embodiment shown in FIG. 5 but showing the pivotally supported passenger protective frame in its lowered position;
FIG. 7 is a fragmentary top plan view, showing the front ends of the side frame sections attached to the windshield, the view looking in the direction of arrows 7 in FIG. 5 but on a larger scale;
FIGS. 8 and 9 are fragmentary sectional views taken along lines 8—8 and 9—9, respectively, of FIG. 7;
FIG. 10 is a fragmentary sectional view taken along line 10—10 of FIG. 9;
FIGS. 11 and 12 are sectional view taken along lines 11—11 and 12—12, respectively, of FIG. 5, but on larger scales;
FIG. 13 is a fragmentary sectional view taken along line 13—13 of FIG. 11; and
FIG. 14 is a fragmentary view looking in the direction of arrow 14 of FIG. 12.

For illustrative purposes, the present invention is described in connection with a so-called "Jeep" of the four wheel drive type. It includes a chassis 20 which is supported by four wheels 24 through suitable springs. The chassis carries a body 26 forming a passenger and baggage compartment 28. The chassis also includes an engine (not shown) covered by the hood 30. The compartment carries two passenger seats 32 and the other mechanism necessary for guiding the vehicle and manipulating the transmission mechanism between the engine and the driving wheels. In the embodiment shown in FIGS. 1 to 4 in the drawings, the windshield frame 34 is sturdily fixed to the chassis. The windshield frame is of sturdy construction. The vehicle thus far described is of standard manufacture by Willys.

Referring to the embodiment shown in FIGS. 1 to 4, the top or cover support comprises two side frame sections herein referred to as the left side frame section 38 and the right side frame section 40. The left side frame section 38 includes a horizontally extending portion 42, the front end of which is connected with the upper portion of the windshield frame 34 by a suitable rubber coupling 44. This side frame section also includes a rearwardly and downwardly extending portion 46, formed integrally with the portion 42 and the lower end thereof is suitably fixed to the chassis 20 as by welding or bolts. Likewise, the right side frame section includes a horizontally extending portion 48, the front end of which is also connected to the opposite side and the top of the windshield frame by a rubber coupling 44. Right side frame section also includes an integrally formed portion 50 which extends rearwardly and downwardly from the rear end of the portion 46. The lower end of the portion 50 is fixed to the chassis by welding or bolts.

A stabilizing bar 54 extends transversely of the frame sections 38 and 40 and each of the opposite ends 58 and 60 thereof carries a lever 62. These levers 62 are fixed to the bar 54, preferably midway of the ends thereof, as by welding. The forward ends of the levers are pivotally mounted on the horizontal portions 42 and 48 of the side frame sections 38 and 40 by bolts 64. Each of the downwardly extending portions 46 and 50 of the side frame sections has an integrally formed ear 66 which extends inwardly. The rear ends 68 of the levers 62 are resiliently connected with the ears 66. Each of the ends 68 of the levers 62 is connected with the ear 66 by a bolt 70, held in place by a nut 72. Rubber coupling members 73 are also held in place by the bolt 70 and the nut 72 to permit limited relative movement between the levers 62 and the side frames 38 and 40. The rubber coupling members are hollow and receive the bolt 70. Each of the extreme ends 58 and 60 of the bars 56 carries an outwardly extending pin 74 which is received by an elongated slot 76 in the side frame sections 38 and 40. The pins 74 are adapted to engage either the tops or bottoms of the wall forming the slots 76 to limit the relative movement between the left side frame section 38 and right side frame section 40.

The side frame sections 38 and 40 are provided with lightening holes 78. The adjacent holes 78 are in staggered relationship with one another for the purpose of lessening the weakening effect of the holes.

From the foregoing, it is apparent that when lateral unevenness is encountered by the vehicle, as it moves over a surface, limited relative movement in vertical directions are provided through the resilient couplings between the side frame sections. The strains normally encountered between two permanently connected side frame sections has a tendency to cause a cracking of the casting. Such cracking has been eliminated by the present invention.

The standard transverse bar 80 of the Jeep is maintained. However, the vertically extending legs of the intermediate transverse bar 82 have been severed. These bars together with the windshield frame 34, supports rods 84, which in turn support the removable cover 86.

Referring now to the embodiment shown in FIGS. 5 to 14, it will be seen that the top frame comprises two side frame sections 138 and 140, including forwardly extending portions 142 and 148, respectively, and rear upwardly extending portions 146 and 150, respectively. Referring specifically to FIGS. 5, 12 and 14, it will be seen that the chassis 22 has welded thereto two U-shaped brackets 121. The lower ends of frame portions 146 and 150 are pivoted to these brackets by pins 123 and are held in upright position by removable pins 125, whereby when the pins 125 are withdrawn, the entire side frames can be swung downwardly to the position shown in FIG. 6. This distance between the upright portions 146 and 150 of the side frame sections 138 and 140 is sufficient to span the seat section 32.

The reinforced wind shield frame 134 is pivotally mounted on the chassis 22 by pins 127 and is held in upright position by removable pins which extend into holes (not shown) in the chassis. The windshield can be swung forwardly to the the position shown in FIG. 6 and held in that position by the same pins 129 in other holes (not shown) in the chassis.

The upper reinforced portion 131 of the windshield frame is provided with two sets of rearwardly extending and superimposed steel brackets. (See FIGS. 5, 9 and 10.) The lower brackets of a set are shown at 133 and the upper brackets at 135. As is more clearly shown in FIG. 9, brackets were drilled to receive removable pins 137.

As shown more specifically in FIGS. 5 and 7, the extreme front ends of the forwardly extending portions 142 and 148 of the side frames 138 and 140 carry a horizontally and transversely extending steel bar 141. The bar is held in place, but not fixed to the ends of portions 142 and 148 by bolts 143, there being a clearance of approximately one-thousandth of an inch between the shank of the bolts and the holes in the bar which receive them, whereby the bolts function as hinge pins.

The bar 141 extends laterally of the front ends of portions 142 and 148 and the ends thereof, as is more clearly shown in FIG. 10, are looped as at 143 and receive the removable pins 137. When these pins 137 and the pins 129 are withdrawn, the windshield can be swung forwardly to the position shown in FIG. 6.

As is more clearly shown in FIGS. 5, 7 and 8, the bar 141 is provided with two sets of rearwardly extending and superimposed brackets. The lower brackets of a set are shown at 147 and the upper brackets at 149. Bolts 151 extend through these brackets and are fixed thereto by nuts 153. The forwardly extending portions 142 and 148 of the side frames have horizontally and outwardly extending steel gusset plates 157 welded thereto. These plates are disposed rearwardly of the bar 141. The outer portions of the gusset plates are drilled vertically to receive the bolts 151.

As is more clearly shown in FIGS. 5 and 8, compressible and expandable material, such as rubber sleeves 145, are disposed above and below the gusset plates 157. These sleeves receive the bolts 151, and, in cooperation with the bar 141, form resilient couplings between the side frame sections 138 and 140 and the windshield frame 134, i.e. the sections 138 and 140 can move vertically relative to one another.

The relative vertical movement is limited by the means more specifically shown in FIGS. 11 and 13. A horizontally extending bracket 161 is welded to that vertical side of frame portion 142 which confronts the frame portion 148 and includes a horizontally and rearwardly extending portion 163. A like bracket 165 is welded to that vertical side of frame portion 148 which confronts the frame portion 142 and includes a horizontally and forwardly extending portion 167. Bracket 165 lies forwardly of bracket 161. A horizontally extending bracket 169 is welded to frame portion 142 and lies directly below the portion 167 of bracket 165. A like bracket 171 is welded to frame portion 148 and lies directly below the portion 163 of bracket 161. Each portion 163 and 167 has a vertically adjustable screw 173 threaded in position and locked in adjusted position by a lock nut 175. Thus when the frame section 138 moves upwardly relative to frame section 140, or when frame section 140 moves downwardly relative to frame section 138, those movements are limited by the engagement of bracket 169 with the screw 173 in portion 167 of bracket 165. Likewise, when the frame section 140 moves upwardly relative to frame section 138, or, when frame section 138 moves downwardly relative to frame section 140, those movements are limited by the engagement of bracket 171 with the screw 173 in portion 163 of bracket 161. A bolt 176 extends through the brackets 161 and 165 and is held in place by a nut 177. A clearance of approximately one-thousandth of an inch between the bolt 176 and the brackets 161 and 165 establishes the bolt as a hinge pin about which the side frame sections 138 and 140 can move vertically relative to one another.

Thus, it will be seen that lateral strain placed upon the side frame sections is absorbed by the resilient means. The frames are sufficiently capable of supporting heavy loads such as a gun mount.

A resilient net 178 formed of nylon or the like, is fastened in any suitable manner to the back of the seat 32 and directly behind the passenger sitting in the seat. The purpose of this net is to prevent accidental impact upon the vehicle from causing whiplash injuries to the neck of the passenger in the vehicle.

I claim:
1. A vehicle comprising in combination:
 (A) a chassis frame;
 (B) a passenger seat carried by the chassis frame;
 (C) means forming a passenger's protection frame including:
  (1) separate and opposite side frames,

(2) means connecting a lower portion of one of the side frames to the chassis,
(3) second means connecting a lower portion of the other side frame to the chassis, the upper portions of the side frames being movable vertically relative to one another;
(4) and resilient means connecting the upper portions of the frames with one another.

2. A vehicle as defined in claim 1, characterized to include:
(D) means for limiting relative movement between the upper portions of the side frame sections.

3. A vehicle as defined in claim 1, characterized in that both of the side frame sections are formed of angle iron and each is provided with lightening holes extending transversely therethrough, the adjacent holes being staggered lengthwise along the frame sections.

4. A vehicle as defined in claim 1, characterized in that the side frames are movable as a unit downwardly and upwardly about the rear ends thereof, and further characterized in that each of the means for connecting the side frames to the chassis is a pivot.

5. A vehicle as defined in claim 4, characterized in that each of the side frames includes:
(1) an upright rear portion;
(2) and a portion extending forwardly;
and further characterized in that distance between the upright portions of the side frames is sufficient to span the passenger seat when the sections are in their lowermost position.

6. A vehicle as defined in claim 5, characterized in that the resilient means provides for limited relative vertical movement between the side frame sections, and further characterized in that the means (D) limits relative vertical movement between the side frame sections.

7. A vehicle as defined in claim 1, characterized to include:
(D) a windshield frame connected to the chassis;
and further characterized in that the resilient means include:
(1) two resilient couplings, one of said couplings conneceting the upper front portion of one of the side frames with the windshield frame, and the other coupling connecting the upper front portion of the other side frames with the windshield frame.

8. A vehicle as defined in claim 7, characterized to include:
(D) means connecting the upper portions of the side frames for limiting relative vertical movements between the side frames.

9. A vehicle as defined in claim 7, characterized in that each of the frame sections includes:
(1) an upright rear portion, said latter portions being connected with the opposite sides of the chassis and merging upwardly toward one another;
(2) and an upper portion, the rears of said upper portions merging, respectively, with the upper sections of the upright rear portions and extending forwardly centrally of the chassis, the forward ends of the upper portions of the frame sections connecting the side frame sections with the windshield frame by said couplings.

10. A vehicle as defined in claim 7, characterized to include:
(E) means for pivotally connecting the windshield frame on the chassis.

11. A vehicle as defined in claim 1, characterized in that the resilient means provides for limited relative vertical movement between the side frame sections.

12. A vehicle as defined in claim 11, characterized to include:
(D) means connecting the upper portions of the side frames for limiting relative vertical movement between the side frames.

13. A vehicle as defined in claim 1, characterized to include:
(D) a transversely extending bar directly connected with the upper portion of one of the side frames; and further characterized in that said resilient means is disposed between the bar and the other of the side frames.

14. A vehicle as defined in claim 13, characterized to include:
(E) a lever fixed to an end of the bar;
(F) means pivotally connecting the lever with one of said side frames; and further characterized in that said resilient means is disposed between the free end of the lever and the said one side frame.

15. A vehicle as defined in claim 13, characterized to include:
(G) means connecting the upper portions of the side frames for positively limiting relative movement between the two side frames.

References Cited

UNITED STATES PATENTS

| | | | |
|---|---|---|---|
| 2,052,535 | 8/1936 | Sherman | 280—106 |
| 2,025,822 | 12/1935 | Pryor | 280—150 |
| 2,740,642 | 4/1956 | Atwood | 280—150 |
| 2,805,887 | 9/1957 | Selby | 296—102 |
| 3,036,858 | 5/1962 | Fingerut | 296—102 |
| 3,203,728 | 8/1965 | Wood | 296—102 |
| 3,289,871 | 12/1966 | Tourneau et al. | 280—150 X |

BENJAMIN HERSH, Primary Examiner

L. J. PAPERNER, Assistant Examiner

U.S. Cl. X.R.

280—150